Dec. 22, 1964   N. J. R. SCHOPPA   3,162,305
LITTER BAG DISPENSER
Filed Jan. 21, 1963

INVENTOR.
NORBERT J. R. SCHOPPA
BY John M. Nolan
ATTORNEY 3,162,305
LITTER BAG DISPENSER
Norbert J. R. Schoppa, 1213 Eastern Ave.,
Davenport, Iowa
Filed Jan. 21, 1963, Ser. No. 252,828
4 Claims. (Cl. 206—57)

This invention relates to a litter bag dispenser and more particularly to a device for holding a litter bag and storing a reserve supply of litter bags for mounting in automobiles or other vehicles.

Most litter bags now in use are mounted singly in automobiles by means of an eyelet in the bag.

An object of the present invention is to provide litter bags which can be conveniently located in the interior of an automobile or other vehicle whereby refuse can be easily stored instead of disposing of it along the streets and highways or in parks or other areas wherein the vehicle is located.

Another object of the invention is to provide a litter bag dispenser containing a plurality of bags which are so mounted that when one bag is filled it may easily be detached exposing another bag ready for use.

Another object of the invention is to provide a litter bag dispenser witth an adhesive back which permits the dispenser to be easily mounted and removed in almost any desired location within a vehicle.

Another object of the invention is to provide a litter bag dispenser whereby a plurality of litter bags can be tightly folded under the dispenser board for storage, saving space and protecting the litter bags from damage while not in use.

Still another object of the invention is to provide a litter bag dispenser which is very simple and inexpensive to manufacture and which also provides a flat readily visible area on both the bags and dispenser board which can be used for printed advertisement.

The foregoing and other objects and advantages of the invention will appear more fully hereinafter from a consideration of the drawings and detailed description which follow. It is to be expressly understood, however, that the drawings are for the purpose of illustration and description and are not to be construed as defining the limits of the invention.

Figure 1:
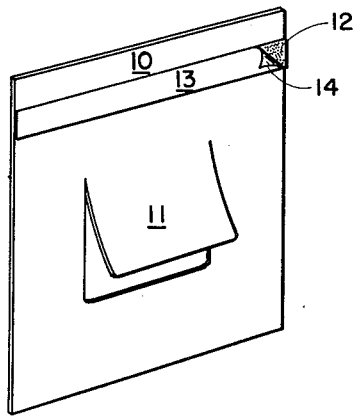
FIG. 1 is a perspective view of the dispenser mounting board from the rear without the litter bags.

Referring now to the drawings and in particular to FIG. 1, there is shown a mounting board 10 composed of a semi-rigid material such as cardboard which forms flap 11, which extends to the rear. Adhesive strip 12 is attached to the rear of mounting board 10 and is covered by backing strip 13 which is removed by pulling at tab 14 exposing the adhesive strip 12.

Figure 3:
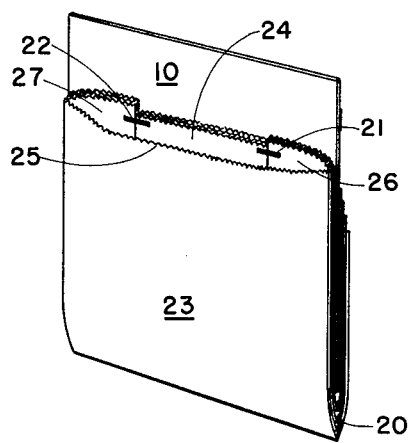
FIG. 3 is a front perspective view of the litter bag dispenser including a plurality of litter bags.

Referring now to FIG. 3, there is shown a plurality of folded bags 20 attached to mounting board 10 by means of staples 21 and 22. Staples 21 and 22 are inserted through the back 24 of each bag but not through the front 25, front 25 being lower than back 24. The outer prong of staples 21 is inserted through folded side 26 and the outer prong of staple 22 is inserted through the opposite folded side 27.

Figure 2:
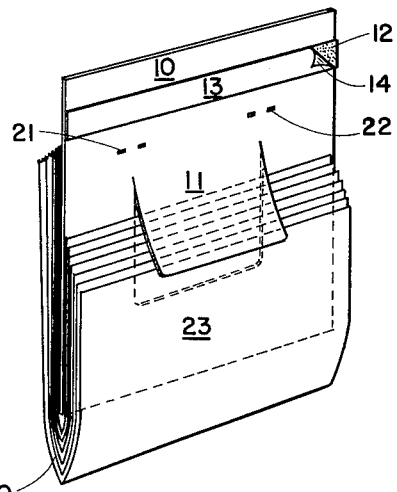
FIG. 2 is a rear perspective view of the litter bag dispenser.

Referring now to FIG. 2, the plurality of bags 20 are shown folded around mounting board 10 and inserted under flap 11.

Figure 4:
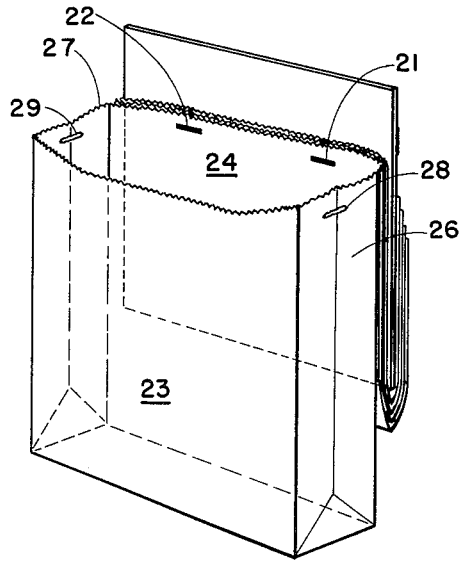
FIG. 4 is a front perspective view of the litter bag dispenser with the top bag unfolded for use.

Referring now to FIG. 4, the dispenser is shown with top bag 23 unfolded and ready for use. To prepare for use top bag 23 is removed from under flap 11 and allowed to hang straight. The front of top bag 23 is then pulled away from mounting board 10 tearing side 26 from staple 21 and side 27 from staple 22 resulting in a small tear 28 in side 26 and another small tear 29 in side 27. When top bag 23 is filled it is removed by pulling back 24 away from staples 21 and 22 exposing another bag which is prepared for use in the same manner as top bag 23. The above procedure is repeated for each of the plurality of bags 20.

While the litter bag dispenser as shown in the drawings is of the construction shown and described, it is understood that the instant invention is not limited to any particular form or construction. Changes and modifications of the novel litter bag dispenser contemplated herein may be made by those skilled in the art without departing from the scope of the instant invention.

I claim:

1. A litter bag dispenser comprising a mounting board of semi-rigid material, a tab formed by said mounting board and projecting to the rear, an adhesive strip attached to the back of said mounting board, the adhesive side facing away from said mounting board, a plurality of collapsed bags each in the same vertically disposed position stapled to the front of said mounting board at the top of said bags, the bottom of each bag being folded around the bottom of said mounting board and inserted under said tab.

2. A litter bag dispenser comprising a mounting board of semi-rigid material, said mounting board forming a tab hingedly connected to said mounting board at the top of said tab and projecting to the rear of said mounting board, means for attaching said mounting board to another object, and a plurality of collapsed paper bags each in the same vertically disposed position having the front portion of the bag slightly shorter than the back with opposite side portions each having a single pleat folded inward, said bags being stapled to said mounting board by means of two staples inserted through the back of each bag, each folded side pleat of each bag being pierced by the outer prong of one staple, the bottom of each bag being folded around the bottom of said mounting board and inserted under said tab.

3. A litter bag dispenser comprising a mounting board of semi-rigid material, a tab formed by said mounting board hingedly connected to said mounting board at the top of said tab and projecting to the rear, an adhesive strip attached to the back of said mounting board, the adhesive side facing away from said mounting board, and a plurality of collapsed paper bags each in the same vertically disposed position having the front portion of the bag slightly shorter than the back with opposite side portions each having a single pleat folded inward, said bags being stapled to said mounting board by means of two staples inserted through the back of each bag, each folded side pleat of each bag being pierced by the outer prong of one staple, the bottom of each bag being folded around the bottom of said mounting board and inserted under said tab.

4. A litter bag dispenser comprising a mounting board of semi-rigid material, said mounting board forming a tab hingedly connected to said mounting board at the top of said tab and projecting to the rear of said mounting board, a strip having an adhesive material on both sides attached to the back of said mounting board, the exterior side of said strip being covered with a removable protective cover, and a plurality of collapsed paper bags each in the same vertically disposed position having the front portion of the bag slightly shorter than the back with opposite side portions each having a single pleat folded inward, said bags being stapled to said mounting board by means of two staples inserted through the back of each bag, each folded side pleat of each bag being pierced by the outer prong of one staple, the bottom of each bag being folded around the bottom of said mounting board and inserted under said tab.

References Cited in the file of this patent
UNITED STATES PATENTS

| | | |
|---|---|---|
| 2,725,141 | Latvala et al. | Nov. 29, 1955 |
| 2,925,175 | Williamson et al. | Feb. 16, 1960 |
| 3,008,569 | Murch | Nov. 14, 1961 |
| 3,089,586 | Cole | May 14, 1963 |